(12) United States Patent
Vanhoy et al.

(10) Patent No.: US 12,704,012 B2
(45) Date of Patent: Aug. 11, 2026

(54) PASSENGER SUITE DOOR WITH QUICK RELEASE EGRESS FEATURE

(71) Applicant: B/E Aerospace, Inc., Winston-Salem, NC (US)

(72) Inventors: Mark Vanhoy, Hamptonville, NC (US); Troy Blackburn, Elkin, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 146 days.

(21) Appl. No.: 18/653,404

(22) Filed: May 2, 2024

(65) Prior Publication Data

US 2025/0341124 A1 Nov. 6, 2025

(51) Int. Cl.
*E05D 15/06* (2006.01)
*B64D 11/06* (2006.01)

(52) U.S. Cl.
CPC ...... *E05D 15/0665* (2013.01); *B64D 11/0606* (2014.12); *E05D 15/063* (2013.01); *E05Y 2201/64* (2013.01); *E05Y 2201/684* (2013.01); *E05Y 2600/14* (2013.01); *E05Y 2600/502* (2013.01); *E05Y 2600/622* (2013.01); *E05Y 2600/63* (2013.01); *E05Y 2900/502* (2013.01); *E05Y 2900/531* (2013.01)

(58) Field of Classification Search
CPC ............. B64D 11/0606; B64C 1/1438; E05D 15/0665; E05D 15/063
See application file for complete search history.

(56) References Cited

U.S. PATENT DOCUMENTS

| | | | | |
|---|---|---|---|---|
| 6,418,588 | B1 * | 7/2002 | Haab | E05D 15/063 49/409 |
| 8,402,606 | B1 * | 3/2013 | Tsai | E05F 5/003 16/49 |
| 10,421,546 | B2 | 9/2019 | Dowty et al. | |
| 11,098,511 | B2 * | 8/2021 | Vander Bent, Jr. | E06B 3/5072 |
| 2011/0179718 | A1 * | 7/2011 | Martin | E05D 15/063 49/413 |
| 2017/0283064 | A1 | 10/2017 | Robinson | |
| 2019/0144098 | A1 | 5/2019 | Gallagher, Jr. et al. | |
| 2019/0329891 | A1 | 10/2019 | Bonnefoy et al. | |
| 2020/0122838 | A1 * | 4/2020 | Bonnefoy | B64D 11/0606 |
| 2021/0179254 | A1 * | 6/2021 | Scotford | B64C 1/1438 |

FOREIGN PATENT DOCUMENTS

| | | | |
|---|---|---|---|
| EP | 2 894 285 | * | 1/2015 |
| WO | WO 2021/084479 | * | 5/2021 |

* cited by examiner

*Primary Examiner* — Gregory J Strimbu
(74) *Attorney, Agent, or Firm* — Suiter Swantz IP

(57) ABSTRACT

A door assembly for an aircraft passenger suite includes a stationary wall, a rail mounted to the stationary wall, a carriage translatably mounted to the rail, a movable door, and a lock pin mounted to the door. The door assembly further includes a carriage subassembly mounted to the carriage including a receiver for receiving the lock pin, and a spring-loaded clamp for exerting a retaining force on the lock pin to retain the lock pin in the receiver. In embodiments, the lock pin has a configuration in which a force required to disengage the lock pin from the receiver is greater than a force required to engage the lock pin in the receiver. In use, in the event of mechanism failure, force can be applied to the door to decouple the lock pin from the receiver to move the door to facilitate egress.

18 Claims, 8 Drawing Sheets

PASSENGER SUITE DOOR WITH QUICK RELEASE EGRESS FEATURE

TECHNICAL FIELD AND BACKGROUND

The present disclosure relates generally to door assemblies for suites such as aircraft passenger suites, and more particularly, to a translating suite door including a quick release egress feature.

Passenger cabins in aircraft and other conveyances can include individual passenger suites. Each passenger suite typically has a dedicated entrance for entering the suite to access a passenger seat. For convenience, each suite entrance is typically directly accessible from an aisle, for instance a longitudinal aircraft aisle. For privacy, a door may be used to close the entrance during flight.

Aviation safety guidelines mandate that suites are equipped with an emergency egress solution to provide a reasonable chance of escape in the event the door mechanism fails. Traditional egress solutions include lever-actuated mechanisms that require the passenger to locate and operate an inconspicuous release lever. During an emergency situation, the requirement to locate and operate an inconspicuous release lever is unreasonable and onerous on the passenger.

Therefore, what is needed is a conspicuous and simple egress solution for passenger suites.

BRIEF SUMMARY

According to one aspect, the inventive concepts according to the present disclosure are directed to a door assembly for an aircraft passenger suite. In embodiments, the door assembly includes a stationary wall, a rail mounted to the stationary wall, a carriage translatably mounted to the rail, a door movable relative to the stationary wall, and a lock pin mounted to the door. The assembly further includes a carriage subassembly mounted to the carriage and including a base, a receiver formed in one end of the base and configured to receive the lock pin, and a spring-loaded clamp rotatably mounted to the base and configured to exert a retaining force on the lock pin to retain the lock pin in the receiver. During normal use of the door, the lock pin is engaged in the receiver such that the attached door translates along the rail. In the event of mechanism or other failure, force can be applied to the door to release the lock pin from engagement in the receiver.

In some embodiments, the door is attached to the carriage when the lock pin is received in the receiver such that translational motion of the carriage along the rail moves the door relative to the stationary wall, and the door is detached from the carriage when the lock pin is disengaged from the receiver.

In some embodiments, the lock pin includes a cylindrical front end and a bulbous portion positioned rearward of the cylindrical front end, wherein the bulbous portion has a front annular chamfer that slopes upward away from the cylindrical front end and a rear annular chamfer that slopes downward in a direction away from the cylindrical front end.

In some embodiments, a slope of the rear annular chamfer is greater than a slope of the front annular chamfer such a force required to disengage the lock pin from the receiver is greater than a force required to engage the lock pin in the receiver.

In some embodiments, the spring-loaded clamp includes a front portion configured to slide past the front annular chamfer as the lock pin is advanced in the receiver, and come to rest against the rear annular chamfer when the lock pin is fully engaged in the receiver, a middle portion that rotates about a fulcrum, and a rear portion that engages a compression spring disposed between the rear portion of the spring-loaded clamp and a spring seat formed in the carriage subassembly.

In some embodiments, the compression spring biases the front portion of the spring-loaded clamp toward a longitudinal axis of the receiver.

In some embodiments, the carriage carries a plurality of vertical oriented rollers configured to roll along the rail.

In some embodiments, the rail, the carriage, and the carriage subassembly form an upper attachment interface positioned at a top of the door, the door assembly includes a like one of the rail, the carriage, and the carriage subassembly positioned at a bottom of the door forming a lower attachment interface, and the upper attachment interface and the lower attachment interface are substantially symmetrical.

In some embodiments, the assembly further includes an indicator subassembly configured to report a coupling status of the locking pin and the carriage. In embodiments, the indicator subassembly includes a crank rotatably mounted to the door, wherein the carriage subassembly maintains the crank in a first position when the locking pin is engaged in the receiver, and the crank is free to rotate to a second position when the locking pin is disengaged from the receiver, a link coupled to the crank, and an indicator coupled to the link, wherein the indicator is maintained within the door when the crank is in the first position, and the indicator is positioned outside of the door when the crank is in the second position, and wherein the indicator positioned outside of the door is indicative of a decoupled state of the door.

According to another aspect, the inventive concepts according to the present disclosure are directed to an assembly for removably attaching a translating door to a stationary wall. In embodiments, the door can be moved to close a suite entrance for privacy during flight and opened in preparation for taxi, take-off, and landing (TTOL). During normal use of the door, the door is engaged with upper and lower rails and translates horizontally relative to the rails. In the event the rail mechanisms fail, become obstructed, or are otherwise rendered inoperable, force can be applied to the door to decouple the door from the translation mechanisms such that the door can be moved out of the suite entrance to facilitate egress. In embodiments, the door can be decoupled solely by force and without the use of tools or actuation of a release lever.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
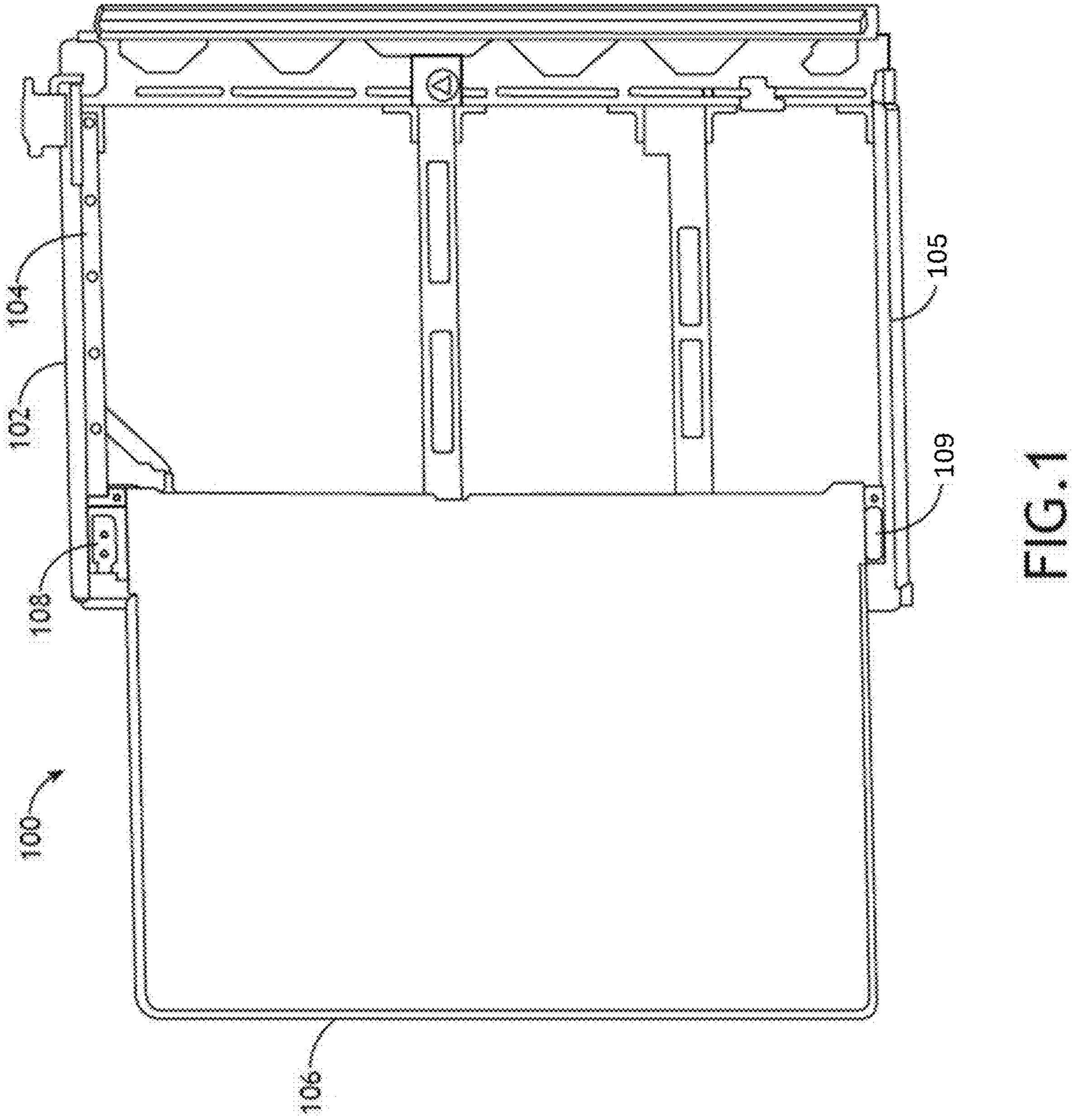
FIG. 1 is a perspective view of a door assembly showing the door in a deployed state, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a door assembly including an emergency egress solution. The door assembly may be used, for example, in conjunction with a passenger suite, for instance a passenger suite in an aircraft passenger cabin. In a particular conceived example, the passenger suite may include an aisle entrance for accessing an interior space, and the door assembly may be positioned alongside the aisle. In embodiments, the door assembly includes a stationary wall and a door movable relative to the stationary wall between a deployed position closing the entrance and stowed position opening the entrance. In some embodiments, the door translates horizontally between the stowed and deployed positions. The door assembly may be used in conjunction with other applications and interior spaces that benefit from a quick door release mechanism.

In embodiments, the door is attached to rails, for instance top and bottom rails, such that the door translates horizontally and stably along the rails between the stowed and deployed positions. During normal use (e.g., when the rail mechanisms are functioning as intended), the door is coupled to carriage assemblies translatably mounted to the rails. When the rail mechanisms fail, are obstructed, or otherwise become inoperable, the door can be quickly and simply decoupled from the rails such that the door can be moved out of the entrance to facilitate egress from the passenger suite or other space. The door can be manipulated by the passenger in the suite, or a crew member or other passenger in the aircraft. In embodiments, the door can be decoupled from the carriage assemblies by applying force against the door, thereby obviating the need for an actuatable release lever and/or tools to decouple the door. Thus, the door assembly provides a translation solution for normal use and a quick release egress solution for emergency use.

Figure 2:
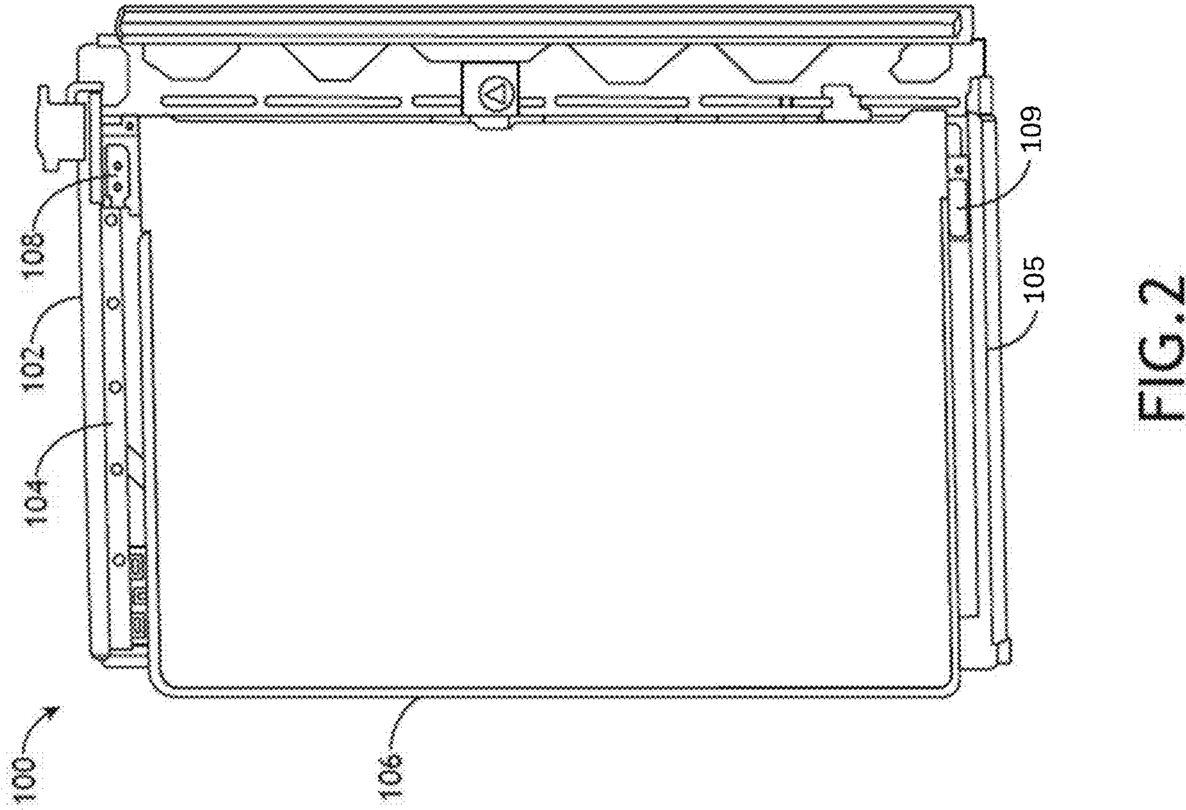
FIG. 2 is a perspective of the door assembly showing the door in a stowed state, in accordance with example embodiments of this disclosure.

FIGS. 1 and 2 illustrate a door assembly 100 according to an exemplary embodiment of the present disclosure. The door assembly 100 includes a stationary wall 102 for positioning alongside an aisle or elsewhere. At least one rail is mounted to the stationary wall 102, for instance mounted to an interior facing side of the stationary wall 102. In a preferred embodiment, the assembly 100 includes a top rail 104 and a bottom rail 105 for supporting the respective top and bottom of the door 106. A carriage is translatably mounted to each rail, thus in the preferred embodiment, the assembly 100 includes an upper carriage 108 and a lower carriage 109. As described in detail below, the door 106 is independently and releasably attached to the upper and lower carriages 108, 109 such that the carriages 108, 109 function to smoothly and stably horizontally translate the door 106 between the fully stowed position shown in FIG. 2 and the fully deployed position shown in FIG. 1, through intermediate positions. The dimensions and aesthetic features of the stationary wall 102 and the door 106 are not critical to the assembly 100.

Figure 3:
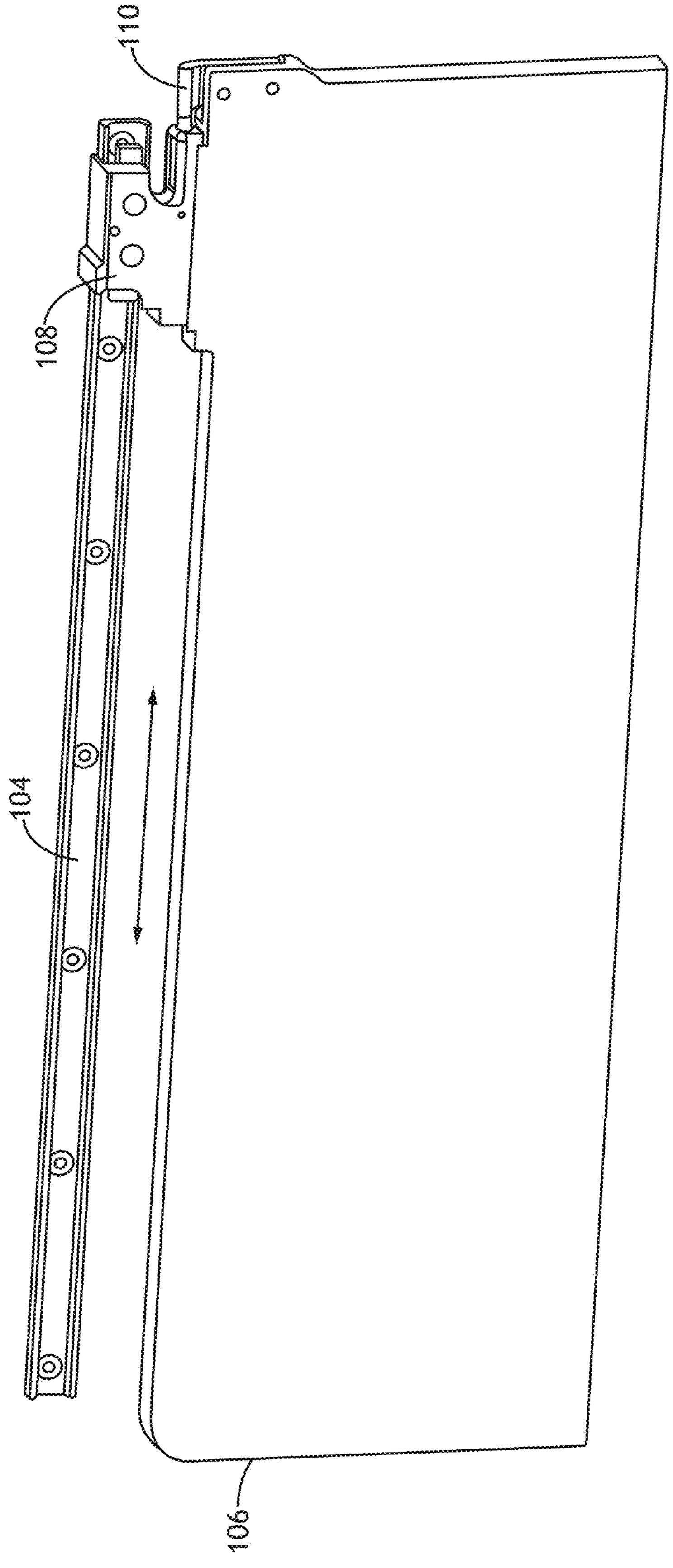
FIG. 3 is a perspective view showing a rail and carriage interface for attaching and translating the door, in accordance with example embodiments of this disclosure.

FIG. 3 illustrates a portion of the door assembly, and more particularly, the upper attachment portion of the door assembly. In embodiments, the door 106 is suspended from above and supported from below in a symmetrical or substantially symmetrical configuration. The top rail 104 is elongated and may be mounted horizontally or substantially horizontally. The upper carriage 108 is translatably mounted to the top rail 104 such that the upper carriage 108 travels back and forth along the top rail 104 to move the door between the stowed and deployed positions. As shown in the perspective of FIG. 3, the door 106 is deployed by moving the door 106 to the left, and is stowed or decoupled from the upper carriage 108 by moving the door to the right. When fully stowed as shown in FIG. 3, it may be unnecessary to decouple the door 106 from the upper carriage 108 since the door position corresponds to a fully open state of the entrance. Were the upper carriage 108 to become 'stuck' at any point to the left along the top rail 104 as shown, then it may be necessary to decouple the door 106 because the door position would correspond to at least a partially obstructed entrance.

The door assembly further includes a lock pin 110 mounted to the door 106. As shown, the lock pin 110 is mounted to an 'interior' face of the door 106 and a portion of the lock pin 110 extends above the door 106. As shown in the perspective of FIG. 3, the lock pin 110 faces to the left to engage with a portion of the upper carriage 108 that faces to the right. In this configuration, the door 106 can be coupled to the upper carriage 108 by pulling the door 106 toward the stationary upper carriage 108, and decoupled from the upper carriage 108 by pushing the door 106 away from the upper carriage 108, wherein the pushing and the pulling are performed in opposite directions. Although not shown, mechanical stops may be provided at the opposing ends of the top rail 104 to limit carriage travel along the top rail in both directions.

Figure 4:
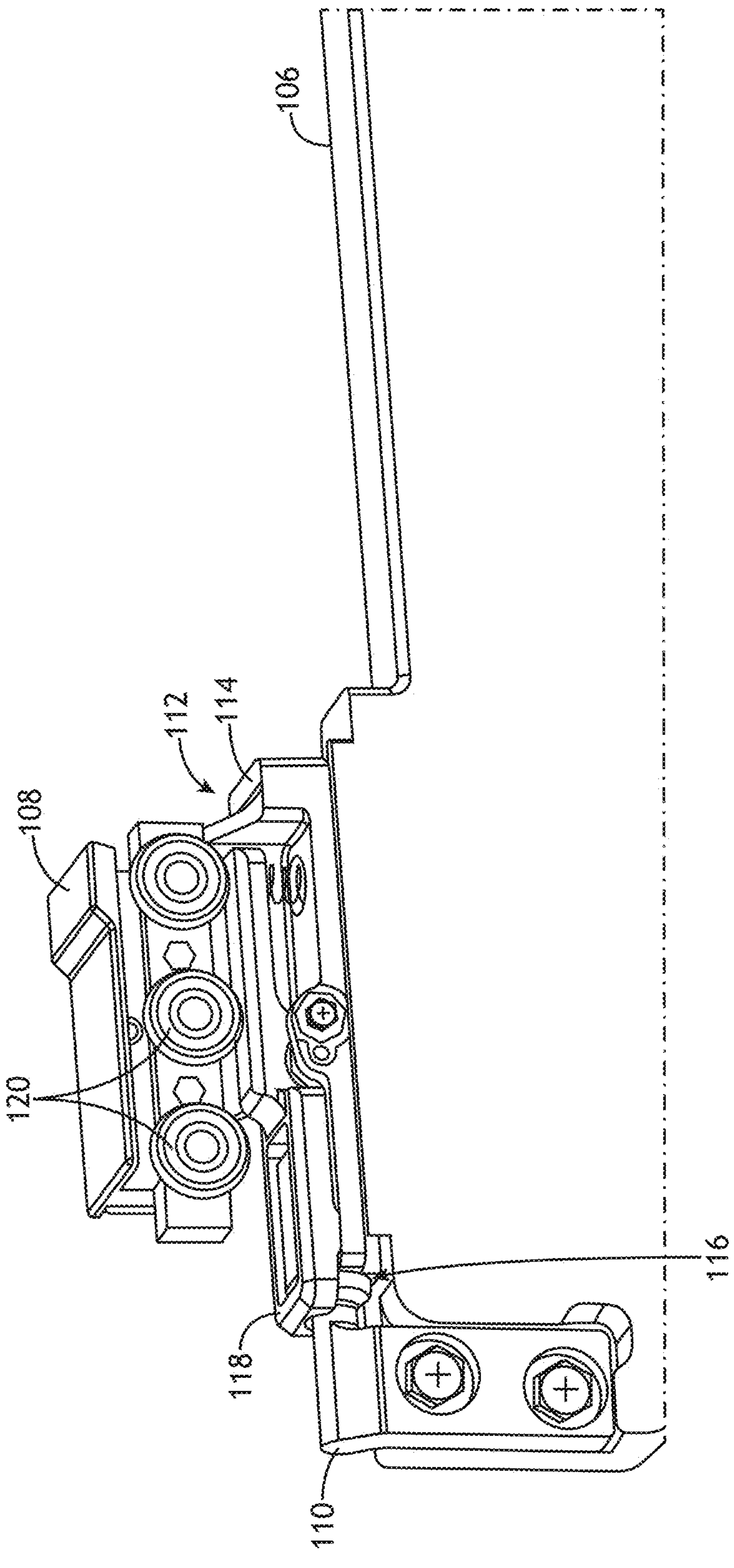
FIG. 4 is a fragmentary perspective view showing the door lock pin engaged in the carriage receiver thereby coupling the door to the carriage, in accordance with example embodiments of this disclosure.
Figure 5:
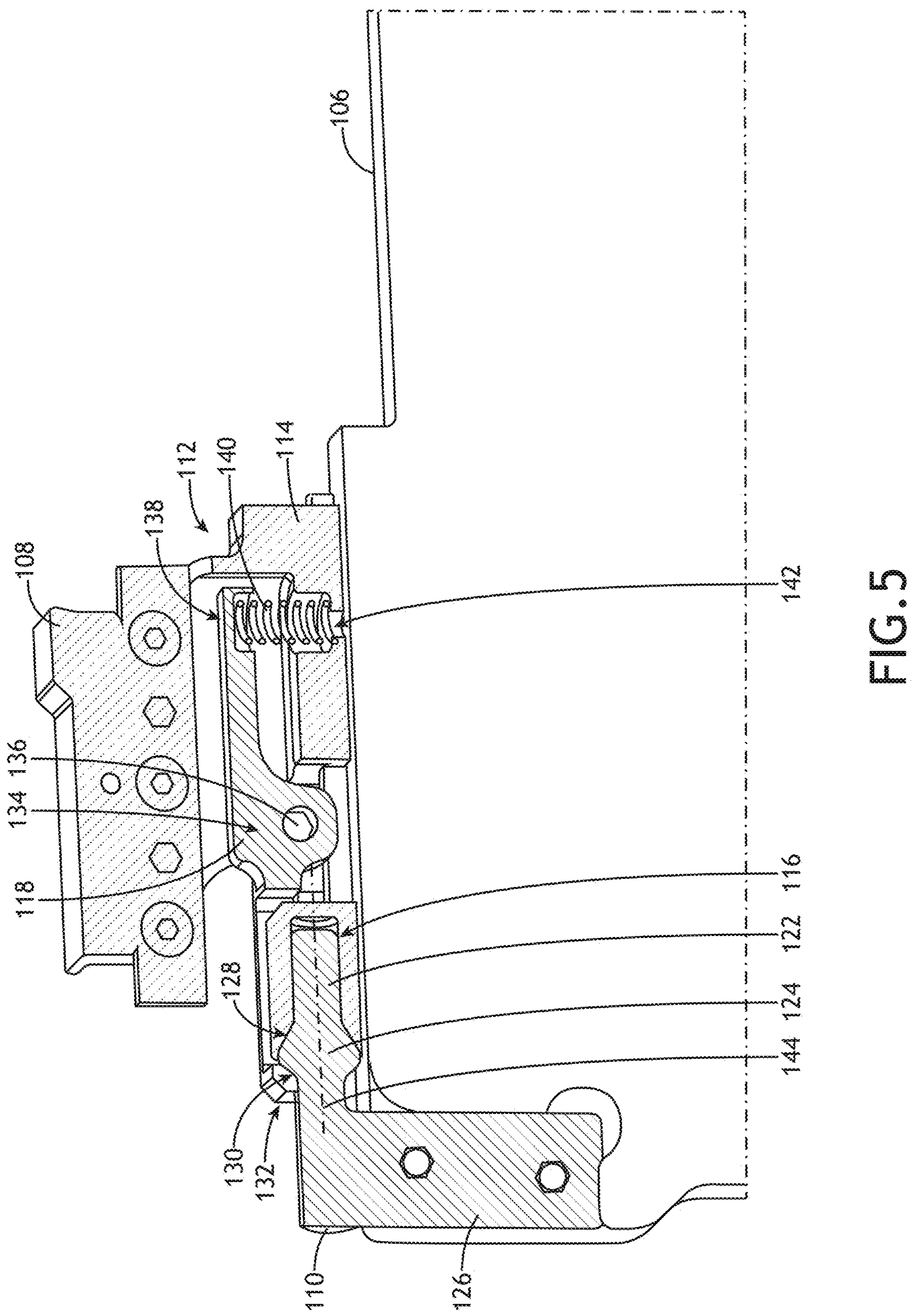
FIG. 5 is a cross-sectional view showing the engagement and retention of the lock pin in the carriage receiver, in accordance with example embodiments of this disclosure.

FIGS. 4 and 5 illustrate the coupled state of the door 106 and the upper carriage 108. It should be understood that while the upper interface is shown and described further, a like lower interface includes the same component configuration in a symmetrical arrangement to support the door 106 at each of the top and bottom. In embodiments, a carriage subassembly 112 is mounted to the upper carriage 108. The carriage subassembly 112 includes a base 114, a receiver 116 formed in one end of the base 114, and a spring-loaded clamp 118 rotatably mounted to the base 114. In use, the receiver 116 is configured to receive the lock pin 110 to couple the door 106 to the upper carriage 108, and the lock pin 110 is configured to be pulled from the receiver 116 to decouple the door 106 from the upper carriage 108. The spring-loaded clamp 118 is configured to exert a retaining force on the lock pin 110, when engaged in the receiver 116, to retain the lock pin 110 in the receiver 116. In embodiments, a plurality of vertically oriented rollers 120 may be rotatably mounted to the upper carriage 108 to facilitate smooth and quiet door motion.

With reference to FIG. 5, in embodiments, the lock pin 110 includes a cylindrical front end 122, and a bulbous portion 124 positioned rearward of the cylindrical front end 122. In embodiments, the lock pin 110 further includes a base 126 for mounting the lock pin 110 to the door 106. In embodiments, the bulbous portion 124 has a front annular chamfer 128 that slopes upward away from the cylindrical front end 122, and a rear annular chamfer 130 that slopes downward in a direction away from the cylindrical front end 122. In some embodiments, an intermediate plateau or rounding provides a gradual transition between the front annular chamfer 128 and the rear annular chamfer 130.

In embodiments, the spring-loaded clamp 118 includes a front portion 132 configured to slide past the front annular chamfer 128 as the lock pin 110 is advanced in the receiver 116, and come to rest against the rear annular chamfer 130 when the lock pin 110 is fully engaged in the receiver 116. The spring-loaded clamp 118 further includes a middle portion 134 that rotates about a fulcrum 136, and a rear portion 138 that engages a compression spring 140 disposed between the rear portion 138 and a spring seat 142 formed in the base 114. The front portion 132 of the spring-loaded clamp 118 is biased in a direction toward the longitudinal axis 144 of the receiver 116.

In use, advancing the cylindrical end 122 of the lock pin 110 into the receiver 116 causes the lock pin to come into contact with the front portion 132 of the spring-loaded clamp 118 thereby causing the front portion 132 to deflect 'upward' against the force of the compression spring 140. The advancement of the lock pin 110 drives the front portion 132 'upward' as the front portion 132 slides past the ramped surface of the front annular chamfer 128. Continued advancement of the lock pin 110 in the receiver 116 causes the front portion 132 to clear the apex of the bulbous portion 124 and come to rest in contact with the rear annular chamfer 130. The spring force of the compression spring 140 biases the front portion 132 into contact with the rear annular chamfer 130 to retain the lock pin 110 in the receiver 116.

In embodiments, the slope of the rear annular chamfer 130 may be greater than the slope of the front annular chamfer 128 such that a force required to disengage the lock pin 110 from the receiver 116 is greater than a force required to engage the lock pin 110 in the receiver 116. Thus, the lock pin 110 may be tuned such that it is easier to reset the door than it is to release the door. In a non-limiting example, the slope of the front annular chamfer 128 may be about 30° whereas the slope of the rear annular chamfer 130 may be about 45°. In addition, the spring force may be tuned to adjust the tension of the spring-loaded clamp 118.

Figure 6:
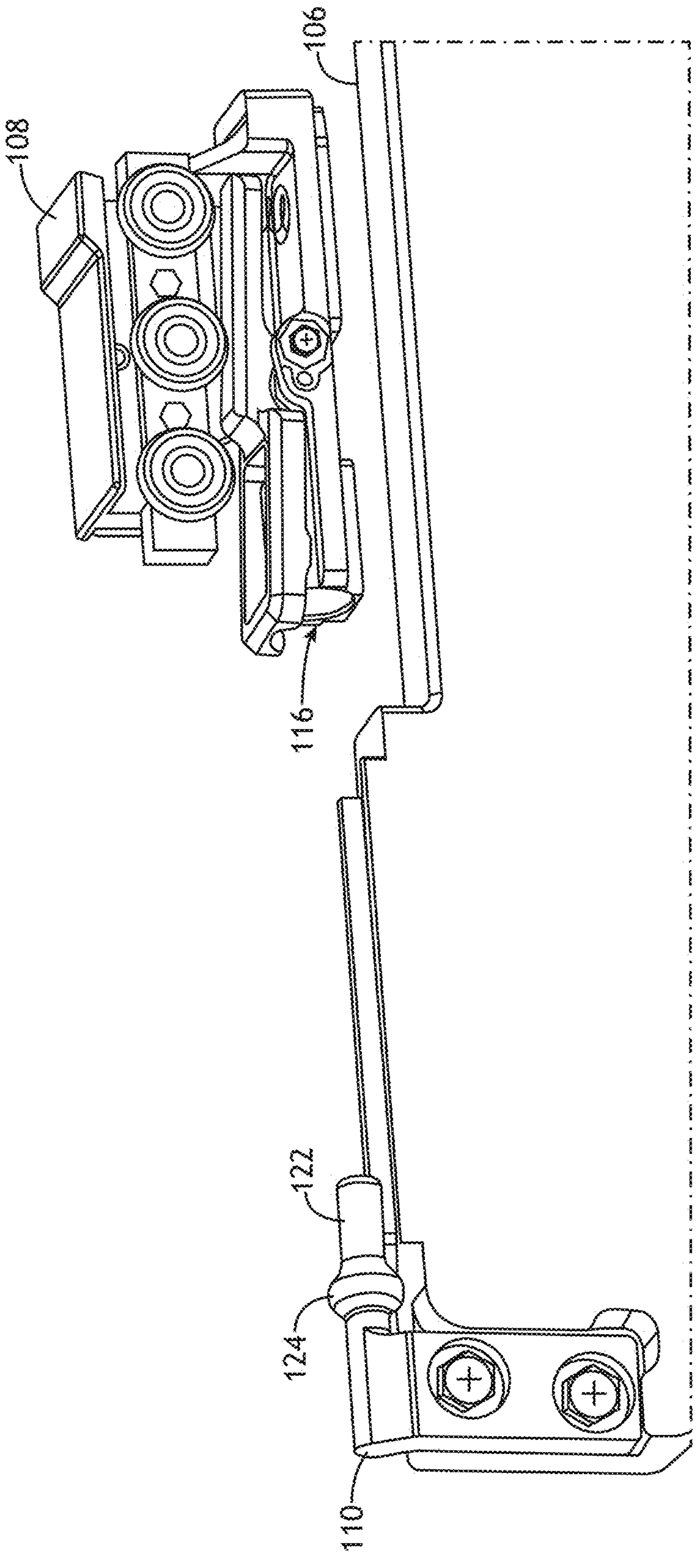
FIG. 6 is a fragmentary perspective view showing the door lock pin and the carriage in a decoupled state, in accordance with example embodiments of this disclosure.

FIG. 6 illustrates the lock pin 110 and the upper carriage 108 in a decoupled state corresponding to a decoupled state of the door 106. FIG. 6 further illustrates the geometry of the cylindrical front end 122 and the bulbous portion 124 which may be shaped differently while performing the same or substantially the same. As shown, the receiver 116 has a cylindrical opening for receiving the corresponding cylindrical front end 122 of the lock pin 110, and the spring-loaded clamp 118 is in position ready to engage the lock pin 110.

Figure 7:
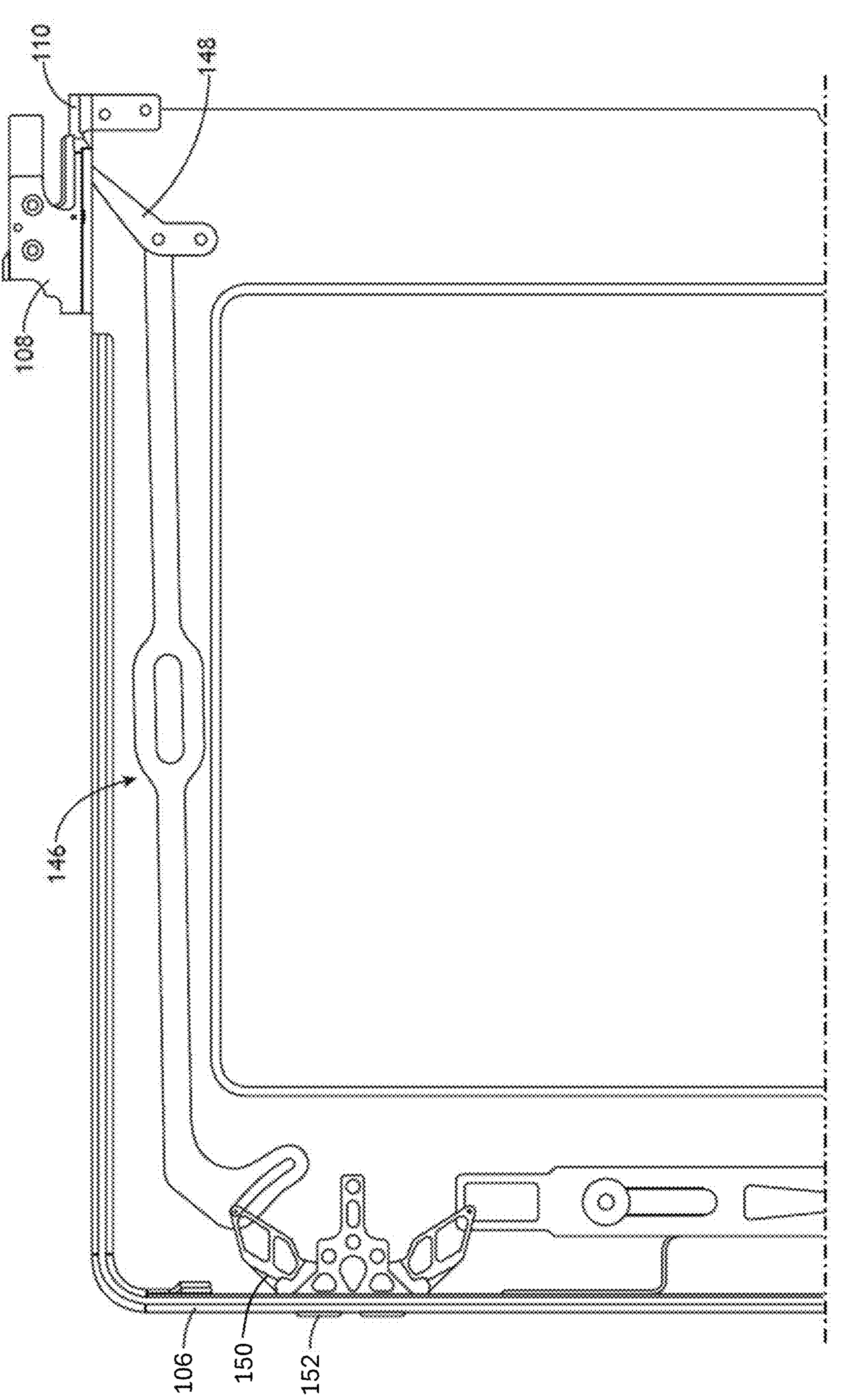
FIG. 7 is a fragmentary elevation view showing an indicator subassembly indicating a coupled state of the door lock pin and the carriage receiver, in accordance with example embodiments of this disclosure.
Figure 8:
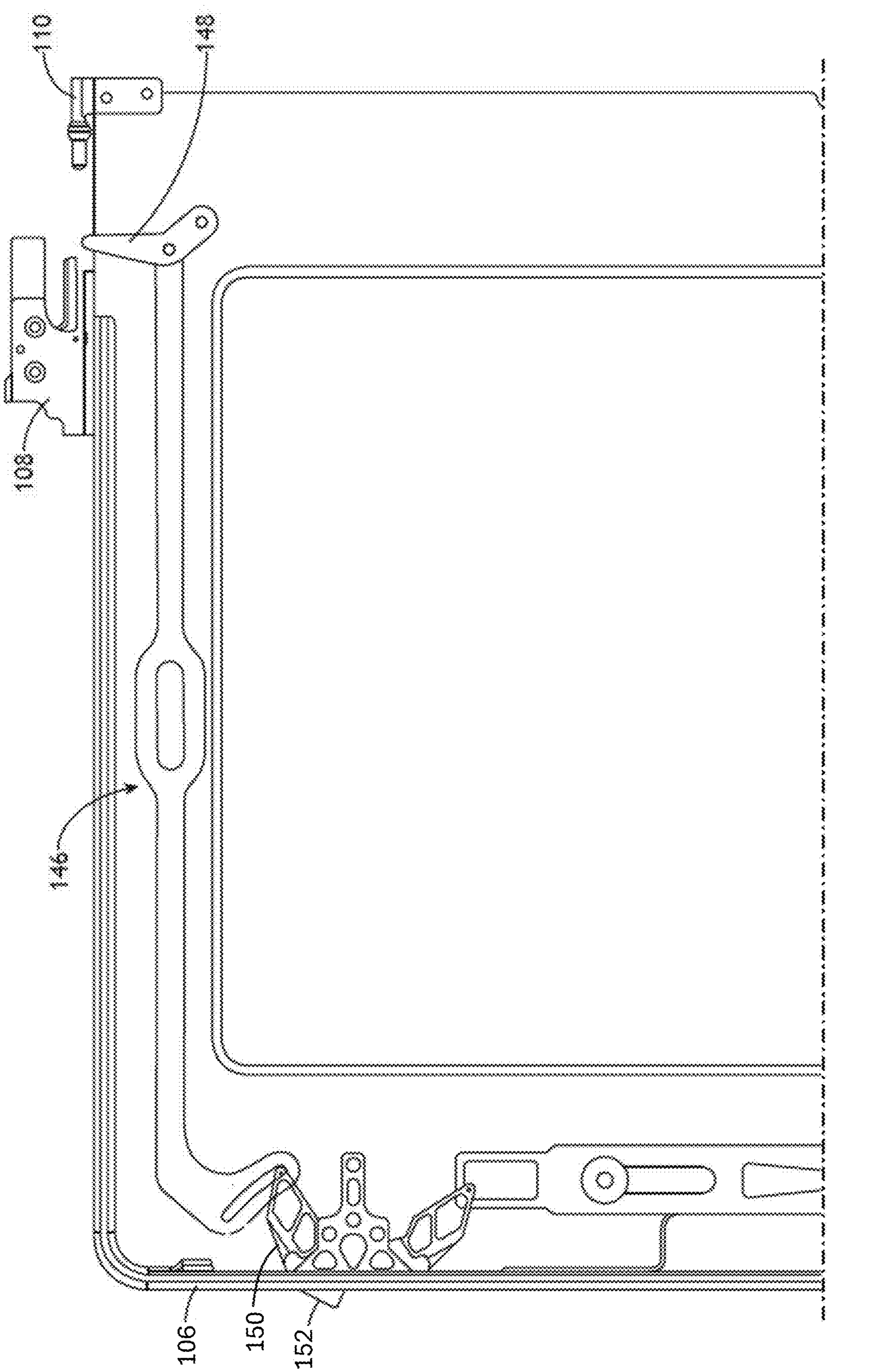
FIG. 8 is a fragmentary elevation view showing the indicator subassembly indicating a decoupled state of the door lock pin and the carriage receiver, in accordance with example embodiments of this disclosure.

FIGS. 7 and 8 illustrate a mechanical indicator subassembly 146 for indicating a coupled status of the door 106 and the upper carriage 108. FIG. 7 illustrates the configuration of the mechanical indicator subassembly 146 when the door 106 is coupled to the upper carriage 108, while FIG. 8 illustrates the configuration of the mechanical indicator subassembly 146 when the door 106 is decoupled from the upper carriage 108. In use, the mechanical indicator subassembly 146 provides a visual indication to the flight crew when the door 106 is decoupled to alert the flight crew to the need for servicing or other attention.

In embodiments, the subassembly 146 includes a crank 148 rotatably mounted to the door 106. In use, the upper carriage 108, for instance the base 114 of the carriage subassembly 112, maintains the crank 148 in a first position within the confines of the door 106 when the locking pin 110 is engaged in the upper carriage 108 (see FIG. 7), and the crank 148 is freed to rotate to a second position outside of the confines of the door 106 when the locking pin 110 is disengaged from the upper carriage 108 (see FIG. 8). A link 150, coupled at one end to the crank 148, is further coupled at an opposing end to an indicator 152.

In use, the indicator 152 is maintained within the confines of the door 106 when the crank 148 is in the first position as shown in FIG. 7, and the indicator 152 is positioned outside of the door 106 when the crank 148 is in the second position as shown in FIG. 8. Separate indicator subassemblies may be provided for each of the top and bottom carriage interfaces such that the flight crew can be made aware of a decoupled status of each of the top and bottom assemblies.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A door assembly for an aircraft passenger suite, comprising:
- a stationary wall forming part of the aircraft passenger suite;
- a rail mounted to the stationary wall;
- a carriage translatably mounted to the rail;
- a door movable relative to the stationary wall;
- a lock pin mounted to the door;
- a carriage subassembly mounted to the carriage, the carriage subassembly including:
  - a base;
  - a receiver formed in one end of the base and configured to receive the lock pin; and
  - a spring-loaded clamp rotatably mounted to the base and configured to exert a retaining force on the lock pin to retain the lock pin in the receiver; and
- an indicator subassembly configured to report a coupling status of the lock pin and the carriage, the indicator subassembly comprising:
  - a crank rotatably mounted to the door, wherein the carriage subassembly maintains the crank in a first position when the lock pin is engaged in the receiver, and the crank is free to rotate to a second position when the lock pin is disengaged from the receiver;
  - a link coupled to the crank; and
  - an indicator couped to the link, wherein the indicator is maintained within the door when the crank is in the first position, and the indicator is positioned outside of the door when the crank is in the second position, and wherein the indicator positioned outside of the door is indicative of a decoupled state of the door.

2. The door assembly according to claim 1, wherein:
- the door is attached to the carriage when the lock pin is received in the receiver such that translational motion of the carriage along the rail moves the door relative to the stationary wall; and
- the door is detached from the carriage when the lock pin is disengaged from the receiver.

3. The door assembly according to claim 1, wherein the lock pin comprises:
- a cylindrical front end; and
- a bulbous portion positioned rearward of the cylindrical front end, the bulbous portion having a front annular chamfer that slopes upward away from the cylindrical front end, and a rear annular chamfer that slopes downward in a direction away from the cylindrical front end.

4. The door assembly according to claim 3, wherein a slope of the rear annular chamfer is greater than a slope of the front annular chamfer such that a force required to disengage the lock pin from the receiver is greater than a force required to engage the lock pin in the receiver.

5. The door assembly according to claim 3, wherein the spring-loaded clamp comprises:
- a front portion configured to slide past the front annular chamfer as the lock pin is advanced in the receiver, and come to rest against the rear annular chamfer when the lock pin is fully engaged in the receiver;
- a middle portion that rotates about a fulcrum; and
- a rear portion that engages a compression spring disposed between the rear portion of the spring-loaded clamp and a spring seat formed in the carriage subassembly.

6. The door assembly according to claim 5, wherein the compression spring biases the front portion of the spring-loaded clamp toward a longitudinal axis of the receiver.

7. The door assembly according to claim 1, wherein the carriage carries a plurality of vertical oriented rollers configured to roll along the rail.

8. The door assembly according to claim 1, wherein:
- the rail, the carriage, and the carriage subassembly form an upper attachment interface positioned at a top of the door;
- the door assembly comprises a second rail, a second carriage, and a second carriage subassembly positioned at a bottom of the door forming a lower attachment interface; and
- the upper attachment interface and the lower attachment interface are substantially symmetrical.

9. An assembly for removably attaching a translating door to a stationary wall, the assembly comprising:
- a rail mountable to the stationary wall;
- a carriage translatably mounted to the rail;
- a lock pin mountable to the door;
- a carriage subassembly mounted to the carriage, the carriage subassembly including:
  - a base;
  - a receiver formed in one end of the base and configured to receive the lock pin; and
  - a spring-loaded clamp rotatably mounted to the base and configured to exert a retaining force on the lock pin to retain the lock pin in the receiver; and
- an indicator subassembly configured to report a coupling status of the lock pin and the carriage, the indicator subassembly comprising:
  - a crank rotatably mountable to the door, wherein the carriage subassembly maintains the crank in a first position when the lock pin is engaged in the receiver, and the crank is free to rotate to a second position when the lock pin is disengaged from the receiver;
  - a link coupled to the crank; and
  - an indicator couped to the link, wherein the indicator is configured to be maintained within the door when the crank is in the first position, and the indicator is configured to be positioned outside of the door when the crank is in the second position, and wherein the indicator being positioned outside of the door corresponds to a decoupled state of the door.

10. The assembly according to claim 9, wherein:

the door is attached to the carriage when the lock pin is received in the receiver such that translational motion of the carriage along the rail moves the door relative to the stationary wall; and the door is detached from the carriage when the lock pin is disengaged from the receiver.

11. The assembly according to claim 9, wherein the lock pin comprises:

a cylindrical front end; and a bulbous portion positioned rearward of the cylindrical front end, the bulbous portion having a front annular chamfer that slopes upward away from the cylindrical front end, and a rear annular chamfer that slopes downward in a direction away from the cylindrical front end;

wherein the spring-loaded clamp engages the rear annular chamfer to retain the lock pin in the receiver.

12. The assembly according to claim 11, wherein a slope of the rear annular chamfer is greater than a slope of the front annular chamfer such that a force required to disengage the lock pin from the receiver is greater than a force required to engage the lock pin in the receiver.

13. The assembly according to claim 12, wherein the spring-loaded clamp comprises:

a front portion configured to slide past the front annular chamfer as the lock pin is advanced in the receiver, and come to rest against the rear annular chamfer when the lock pin is fully engaged in the receiver;

a middle portion that rotates about a fulcrum; and a rear portion that engages a compression spring disposed between the rear portion of the spring-loaded clamp and a spring seat formed in the carriage subassembly.

14. The assembly according to claim 13, wherein the compression spring biases the front portion of the spring-loaded clamp toward a longitudinal axis of the receiver.

15. The assembly according to claim 9, wherein the carriage carries a plurality of vertical oriented rollers configured to roll along the rail.

16. A passenger suite door assembly, comprising:

a door;

a lock pin mounted to the door;

a carriage subassembly configured to releasably engage the lock pin, the carriage subassembly translatably mountable to a rail mountable to a stationary wall, the carriage subassembly including:

a base;

a receiver formed in one end of the base configured to receive the lock pin; and a spring-loaded clamp rotatably mounted to the base and configured to exert a retaining force on the lock pin to retain the lock pin in the receiver; and an indicator subassembly configured to report a coupling status of the lock pin and the carriage subassembly, the indicator subassembly comprising:

a crank rotatably mounted to the door, wherein the carriage subassembly maintains the crank in a first position when the lock pin is engaged in the receiver, and the crank is free to rotate to a second position when the lock pin is disengaged from the receiver;

a link coupled to the crank; and an indicator couped to the link, wherein the indicator is maintained within the door when the crank is in the first position, and the indicator is positioned outside of the door when the crank is in the second position, and wherein the indicator positioned outside of the door is indicative of a decoupled state of the door relative to the carriage subassembly; and wherein:

in a first operating condition of the passenger suite door assembly, the lock pin is engaged in the carriage assembly such that the door moves with the carriage subassembly as the carriage subassembly translates along the rail; and in a second operating condition of the passenger suite door assembly, the door is configured to be pushed toward an opening direction of the door to disengage the lock pin from the carriage subassembly.

17. The passenger suite door assembly according to claim 16, wherein the first operating condition corresponds to use in which the carriage subassembly is operative to translate the door, and the second operating condition corresponds to use in which the carriage subassembly becomes inoperative to translate the door.

18. The passenger suite door assembly according to claim 16, wherein the lock pin comprises:

a cylindrical front end; and a bulbous portion positioned rearward of the cylindrical front end, the bulbous portion having a front annular chamfer that slopes upward away from the cylindrical front end, and a rear annular chamfer that slopes downward in a direction away from the cylindrical front end;

wherein a slope of the rear annular chamfer is greater than a slope of the front annular chamfer such that a force required to disengage the lock pin from the receiver is greater than a force required to engage the lock pin in the receiver.

* * * * *